(12) United States Patent
Sugiura et al.

(10) Patent No.: US 9,225,032 B2
(45) Date of Patent: Dec. 29, 2015

(54) FUEL CELL

(75) Inventors: Seiji Sugiura, Wako (JP); Daisuke Okonogi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 682 days.

(21) Appl. No.: 13/338,249

(22) Filed: Dec. 28, 2011

(65) Prior Publication Data

US 2012/0178011 A1  Jul. 12, 2012

(30) Foreign Application Priority Data

Jan. 12, 2011  (JP) ................. 2011-004157

(51) Int. Cl.
*H01M 8/24* (2006.01)
*H01M 8/04* (2006.01)
*H01M 8/02* (2006.01)

(52) U.S. Cl.
CPC ............ *H01M 8/242* (2013.01); *H01M 8/0273* (2013.01); *Y02E 60/50* (2013.01)

(58) Field of Classification Search
CPC combination set(s) only.
See application file for complete search history.

(56) References Cited

U.S. PATENT DOCUMENTS

| | | | |
|---|---|---|---|
| 7,005,208 B2 | 2/2006 | Suenaga et al. | |
| 7,947,408 B2 | 5/2011 | Ichioka | |
| 8,551,671 B2 | 10/2013 | Ishikawa et al. | |
| 2007/0287053 A1* | 12/2007 | Ichioka | ............................ 429/34 |
| 2008/0134496 A1 | 6/2008 | Bae | |
| 2009/0004539 A1* | 1/2009 | Ishikawa et al. | ................. 429/35 |
| 2009/0004540 A1* | 1/2009 | Shizuku et al. | .................. 429/35 |
| 2010/0047649 A1 | 2/2010 | Yamada et al. | |
| 2010/0143808 A1 | 6/2010 | Nagano et al. | |
| 2011/0045380 A1 | 2/2011 | Suzuki et al. | |

FOREIGN PATENT DOCUMENTS

| | | |
|---|---|---|
| CN | 101202336 | 6/2008 |
| CN | 101335356 | 12/2008 |
| JP | 08-222237 | 8/1996 |
| JP | 2005-093394 | 4/2005 |
| JP | 2005-268146 | 9/2005 |

(Continued)

OTHER PUBLICATIONS

Chinese Office Action for corresponding CN Application No. 201110418446.2, Dec. 4, 2013.

(Continued)

*Primary Examiner* — Ula C Ruddock
*Assistant Examiner* — Daniel Gatewood
(74) *Attorney, Agent, or Firm* — Mori & Ward, LLP

(57) ABSTRACT

A fuel cell includes a cell unit. The cell unit includes a first separator, a second separator, and an electrolyte-electrode assembly. The electrolyte-electrode assembly is sandwiched between the first separator and the second separator in a stacking direction. The outer periphery of the electrolyte-electrode assembly is integrally provided with frame members composed of a polymer material. Fluid communication holes are provided as through holes in the stacking direction in each of the frame members. The seal member is sandwiched between the frame members that are adjacent to each other in the stacking direction. The first and second separators each have two plates with an identical outer shape. Each of the frame members has a rib projecting in a thickness direction of the frame member, at least around one of an outermost periphery of the frame member and the fluid communication holes.

19 Claims, 16 Drawing Sheets

(56) References Cited

FOREIGN PATENT DOCUMENTS

| JP | 2007-193971 | 8/2007 |
| JP | 2008-147157 | 6/2008 |
| JP | 2009-009838 | 1/2009 |
| JP | 2009-123596 | 6/2009 |
| WO | WO 2006/009277 | 1/2006 |

OTHER PUBLICATIONS

Japanese Office Action for corresponding JP Application No. 2011-004157, Nov. 27, 2012.

* cited by examiner

BACKGROUND ART

FUEL CELL

CROSS-REFERENCE TO RELATED APPLICATIONS

The present application claims priority under 35 U.S.C. §119 to Japanese Patent Application No. 2011-004157, filed Jan. 12, 2011, entitled "Fuel Cell." The contents of this application are incorporated herein by reference in their entirety.

BACKGROUND OF THE INVENTION

1. Field of the Invention

The present invention relates to a fuel cell.

2. Discussion of the Background

For example, in a solid polymer electrolyte fuel cell, a solid polymer electrolyte membrane formed of a polymer ion exchange membrane is employed. In the fuel cell, each unit cell is formed by sandwiching an membrane-electrode assembly (electrolyte-electrode assembly) (hereinafter referred to as an MEA) between separators (bipolar plates), the electrolyte membrane-electrode assembly including a solid polymer electrolyte membrane and anode-side and cathode-side electrodes that are disposed on the respective sides of the solid polymer electrolyte membrane, the anode-side and cathode-side electrodes each including an electrode catalyst layer and porous carbon layer. Normally, a fuel cell stack, in which a predetermined number of unit cells are stacked, is used as, for example, an in-vehicle fuel cell stack.

In general, a fuel cell includes what is called an internal manifold which is provided with an inlet communication hole and an outlet communication hole, the communication holes extending in the stacking direction of the separators. A fuel gas, an oxidant gas, and a cooling medium are then supplied from respective inlet communication holes to a fuel gas passage, an oxidant gas passage, and a cooling medium passage, respectively, that is formed along the planar direction of the electrode surface, and then are discharged into respective outlet communication holes.

For example, the separator for fuel cells disclosed in Japanese Unexamined Patent Application Publication No. 8-222237 includes a separator plate 1 as shown in FIG. 16. The separator plate 1 is formed of a metal plate, and a large number of projections 2a, 2b are formed on the front and back surfaces of the metal plate by emboss press forming or dimple press forming. In the separator plate 1, there are formed manifold loading through ports 3a, 3b, 3c, and 3d outside the projections 2a, 2b forming region, in order to load respective gas manifolds.

The manifold loading ports 3a, 3b, 3c, and 3d are used as, for example, a fuel gas introduction manifold, an oxidant gas introduction manifold, a fuel gas discharge manifold, and an oxidant gas discharge manifold, respectively.

SUMMARY OF THE INVENTION

According to one aspect of the present invention, a fuel cell comprises a cell unit. The cell unit comprises a first separator, a second separator, and an electrolyte-electrode assembly. The electrolyte-electrode assembly has an electrolyte and a pair of electrodes. The pair of electrodes is disposed on respective sides of the electrolyte. The electrolyte-electrode assembly is sandwiched between the first separator and the second separator in a stacking direction. The outer periphery of the electrolyte-electrode assembly is integrally provided with frame members composed of a polymer material. Fluid communication holes are provided as through holes in the stacking direction in each of the frame members. The fluid communication holes has a reactant gas inlet communication hole, a reactant gas outlet communication hole, a cooling medium inlet communication hole, and a cooling medium outlet communication hole. The seal member is sandwiched between the frame members that are adjacent to each other in the stacking direction. The seal member surrounds and seals the fluid communication holes and an outer periphery of a reaction surface of the electrolyte-electrode assembly. The first and second separators each have two plates with an identical outer shape. Outer peripheral edges of the first and second separators are arranged inside the fluid communication holes. Each of the frame members has a rib projecting in a thickness direction of the frame member, at least around one of an outermost periphery of the frame member and the fluid communication holes.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
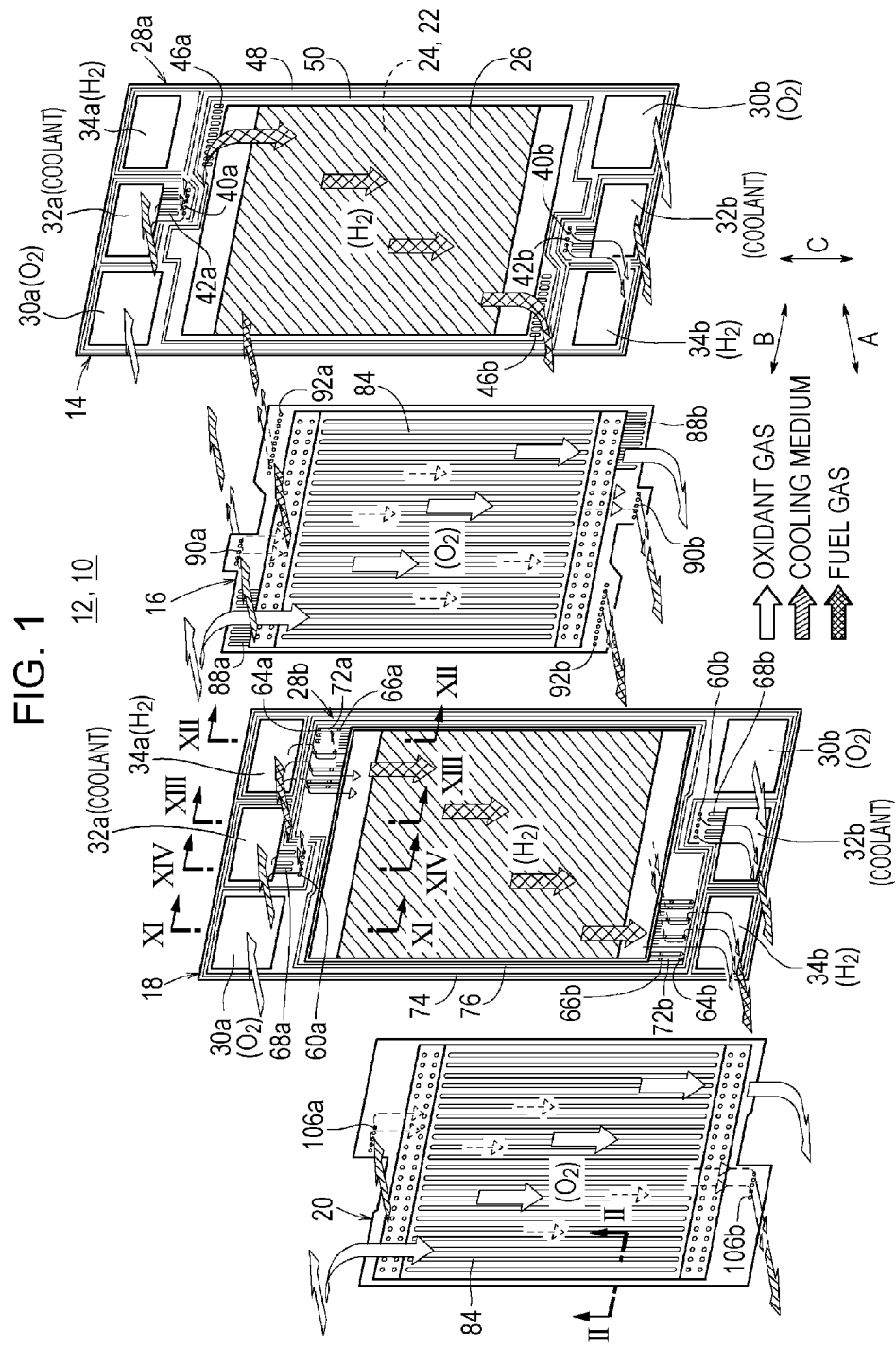
FIG. 1 is an exploded perspective view of a fuel cell according to a first embodiment of the present invention.

The embodiments will now be described with reference to the accompanying drawings, wherein like reference numerals designate corresponding or identical elements throughout the various drawings.

Figure 2:
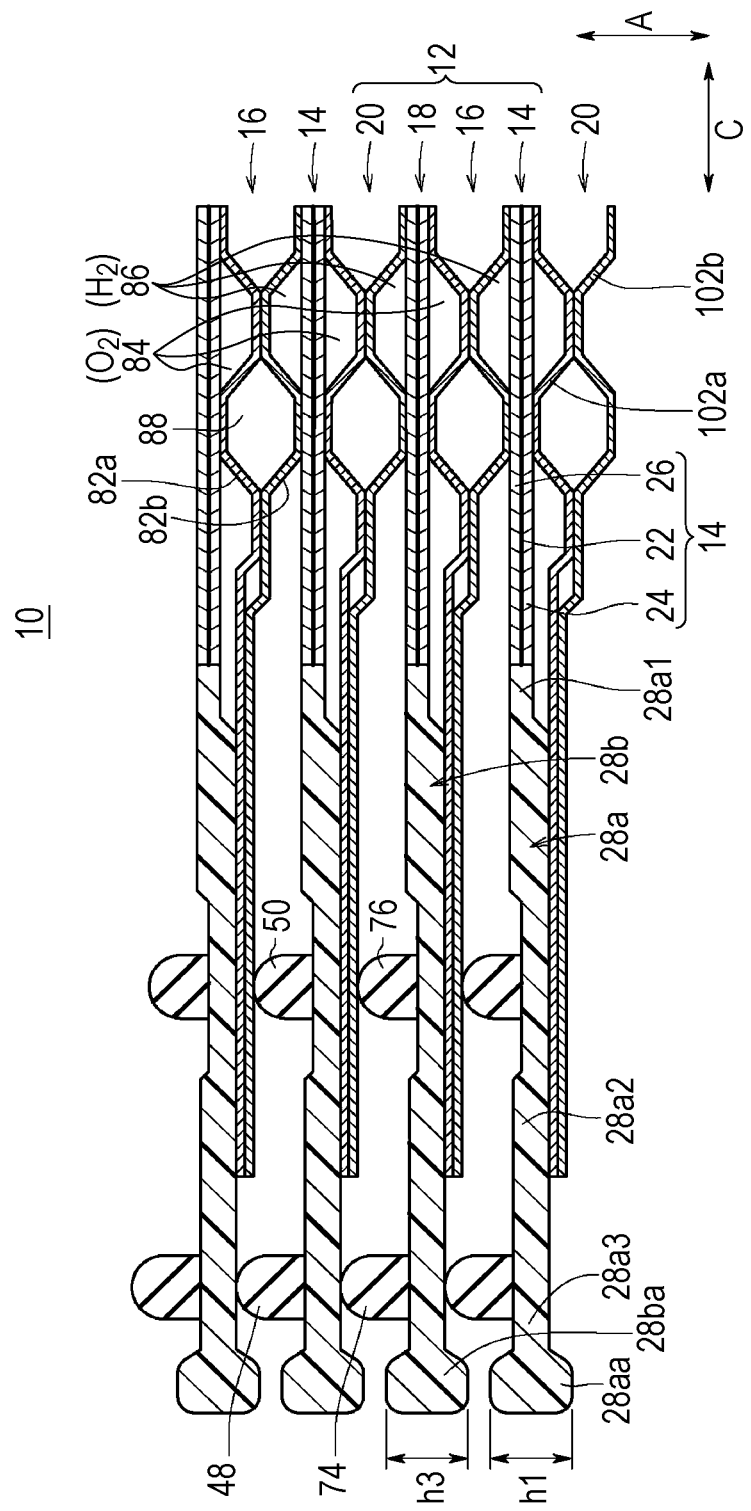
FIG. 2 is a cross-sectional view of the fuel cell taken along the line II-II in FIG. 1.

As shown in FIGS. 1 and 2, a fuel cell 10 according to a first embodiment of the present invention is formed by stacking a plurality of cell units 12 in the direction of an arrow A (horizontal direction).

The cell units 12 each include a first membrane-electrode assembly (electrolyte-electrode assembly) (MEA) 14, a first separator 16, a second membrane-electrode assembly (electrolyte-electrode assembly) (MEA) 18, and a second separator 20. By stacking the cell units 12, the first membrane-electrode assembly 14 is sandwiched between the second and first separators 20, 16. On the other hand, the second membrane-electrode assembly 18 is sandwiched between the first and second separators 16, 20.

The first membrane-electrode assembly 14 and the second membrane-electrode assembly 18 each include, for example, a solid polymer electrolyte membrane (electrolyte) 22 which is a thin perfluoro sulfonic acid membrane impregnated with water, and between a cathode-side electrode 24 and an anode-side electrode 26, the solid polymer electrolyte membrane 22 is sandwiched (see FIG. 2).

The solid polymer electrolyte membrane 22 has surface area that is set to be equal in area to the cathode-side electrode 24 and the anode-side electrode 26, respectively. In the first membrane-electrode assembly 14, the solid polymer electrolyte membrane 22 has surface area that are set to be equal in area to the cathode-side electrode 24 and the anode-side electrode 26, respectively. The outer periphery of the solid polymer electrolyte membrane 22 may extend outside with respect to the cathode-side electrode 24 and the anode-side electrode 26. Furthermore, the cathode-side electrode 24 and the anode-side electrode 26 may have different surface areas.

At the outer peripheral edge of the solid polymer electrolyte membrane 22, the cathode-side electrode 24, and the anode-side electrode 26 in the first membrane-electrode assembly 14, a frame portion (frame member) 28a which is composed of a polymer material having an insulation property is integrally molded, for example, by injection molding. Similarly, at the outer peripheral edge of the solid polymer electrolyte membrane 22, the cathode-side electrode 24, and the anode-side electrode 26 in the second membrane-electrode assembly 18, a frame portion (frame member) 28b which is composed of a polymer material is integrally molded, for example, by injection molding. As the polymer material, a general-purpose plastic, an engineering plastic, a super engineering plastic, or the like may be used.

The cathode-side electrode 24 and the anode-side electrode 26 each have a gas diffusion layer (not shown) which is formed of carbon paper or the like, and an electrode catalyst layer (not shown) which is formed by uniformly coating the surface of the gas diffusion layer with porous carbon particles which carry platinum alloy on the surfaces thereof.

As shown in FIG. 1, at one end (upper end edge) of the frame portions 28a, 28b in the direction of an arrow C (vertical direction), an oxidant gas inlet communication hole 30a for supplying an oxidant gas, e.g., an oxygen containing gas, a cooling medium inlet communication hole 32a for supplying a cooling medium, and a fuel gas inlet communication hole 34a for supplying a fuel gas, e.g., a hydrogen containing gas are arranged and provided in the direction of an arrow B (horizontal direction).

At the other end (lower end edge) of the frame portions 28a, 28b in the direction of the arrow C, a fuel gas outlet communication hole 34b for discharging a fuel gas, a cooling medium outlet communication hole 32b for discharging a cooling medium, and an oxidant gas outlet communication hole 30b for discharging an oxidant gas are arranged and provided in the direction of the arrow B.

Figure 3:
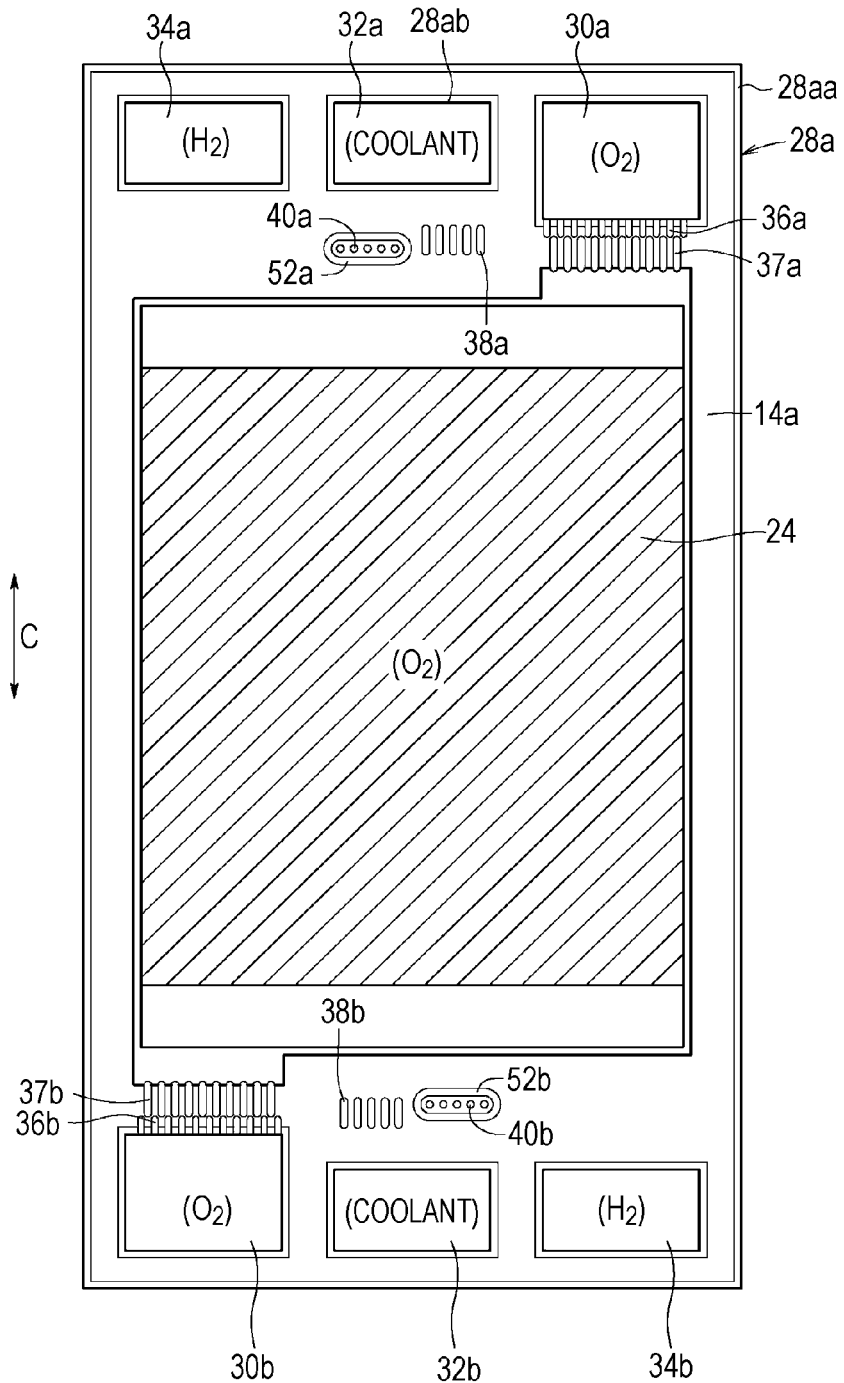
FIG. 3 is an illustration of the cathode face of a first membrane-electrode assembly which constitutes the fuel cell.

As shown in FIG. 3, in the upper portion of the cathode face 14a side (the surface on which the cathode-side electrode 24 is disposed) of the first membrane-electrode assembly 14 in the frame portion 28a, a plurality of inlet projections 36a and inlet grooves 37a are provided below and near the oxidant gas inlet communication hole 30a. In the upper portion on the cathode face 14a side of the frame portion 28a, a plurality of inlet grooves 38a are provided below and near the cooling medium inlet communication hole 32a and in proximity to the oxidant gas inlet communication hole 30a, while a plurality of inlet holes 40a are formed as through holes below and near the cooling medium inlet communication hole 32a and in proximity to the fuel gas inlet communication hole 34a.

In the lower portion on the cathode face 14a side of the frame portion 28a, a plurality of outlet projections 36b and outlet grooves 37b are provided above and near the oxidant gas outlet communication hole 30b. In the lower portion on the cathode face 14a side of the frame portion 28a, a plurality of outlet grooves 38b are provided above and near the cooling medium outlet communication hole 32b and in proximity to the oxidant gas outlet communication hole 30b, while a plurality of outlet holes 40b are formed as through holes above and near the cooling medium outlet communication hole 32b and in proximity to the fuel gas outlet communication hole 34b.

Figure 4:
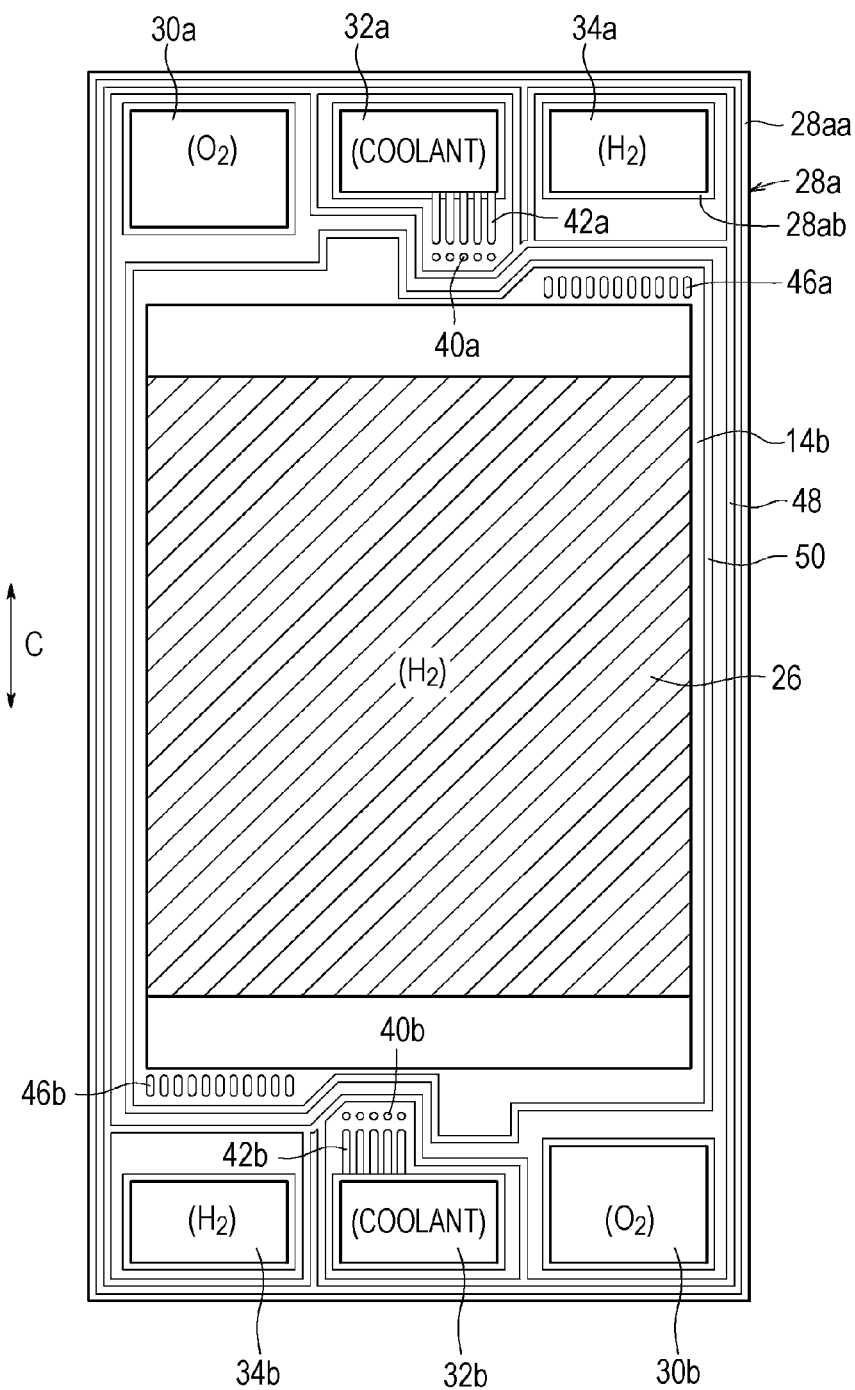
FIG. 4 is an illustration of the anode face of the first membrane-electrode assembly.

As shown in FIG. 4, in the upper portion of the anode face 14b side (the surface on which the anode-side electrode 26 is disposed) of the first membrane-electrode assembly 14 in the frame portion 28a, a plurality of inlet grooves 42a are provided below and near the cooling medium inlet communication hole 32a and in proximity to the fuel gas inlet communication hole 34a. A plurality of inlet holes 40a are formed as through holes below and near the inlet grooves 42a. In the frame portion 28a, a plurality of inlet grooves 46a are provided below the fuel gas inlet communication hole 34a.

In the lower portion on the anode face 14b side of the frame portion 28a, a plurality of outlet grooves 42b are provided above and near the cooling medium outlet communication hole 32b and in proximity to the fuel gas outlet communication hole 34b. A plurality of outlet holes 40b are formed as through holes above and near the outlet grooves 42b. In the frame portion 28a, a plurality of outlet grooves 46b are provided above the fuel gas outlet communication hole 34b.

On the anode face 14b side of the frame portion 28a, an outer seal member (outer seal line) 48, and an inner seal member (inner seal line) 50 are integrally molded or separately molded. As the material for the outer seal member 48 and the inner seal member 50, a sealing material, a cushioning material, or a packing material, such as EPDM, NBR, a fluoride rubber, a silicone rubber, a fluoro silicone rubber, a butyl rubber, a natural rubber, a styrene rubber, a chloroprene or acrylic rubber may be used. Each seal member described below has the same configuration as that of the outer seal member 48 and the inner seal member 50, and thus detailed description is omitted.

The outer seal member 48 surrounds the outer circumferences of all the fluid communication holes, i.e., the oxidant gas inlet communication hole 30a, the cooling medium inlet communication hole 32a, the fuel gas inlet communication hole 34a, the oxidant gas outlet communication hole 30b, the cooling medium outlet communication hole 32b, and the fuel gas outlet communication hole 34b surrounding along the outer peripheral edge of the frame portion 28a as well as the outer circumference of the reaction surface (power generation surface). The outer seal member 48 surrounds each of the cooling medium inlet communication hole 32a, the fuel gas inlet communication hole 34a, the cooling medium outlet communication hole 32b, and the fuel gas outlet communication hole 34b. The inlet grooves 42a and the inlet holes 40a as well as the cooling medium inlet communication hole 32a are surrounded by the outer seal member 48, and the outlet grooves 42b and the outlet holes 40b as well as the cooling medium outlet communication hole 32b are surrounded by the outer seal member 48.

The inner seal member 50 is located inside the outer seal member 48 and surrounds the anode-side electrode 26, the inlet grooves 46a, and the outlet grooves 46b all together.

The inner seal member 50 is disposed along an outline corresponding to the outer edge of the first separator 16, and is in contact with the entire outer peripheral edge (inside the separator surface) of the first separator 16. The outer seal member 48 is disposed outside the outer peripheral edge (outside the separator surface) of the first separator 16. All the fluid communication holes are surrounded and sealed by the outer seal member 48 and the inner seal member 50.

As shown in FIG. 3, on the cathode face 14a side of the frame portion 28a, there are provided a ring-shaped inlet seal member 52a to surround the inlet holes 40a, and a ring-shaped outlet seal member 52b to surround the outlet holes 40b.

Figure 5:
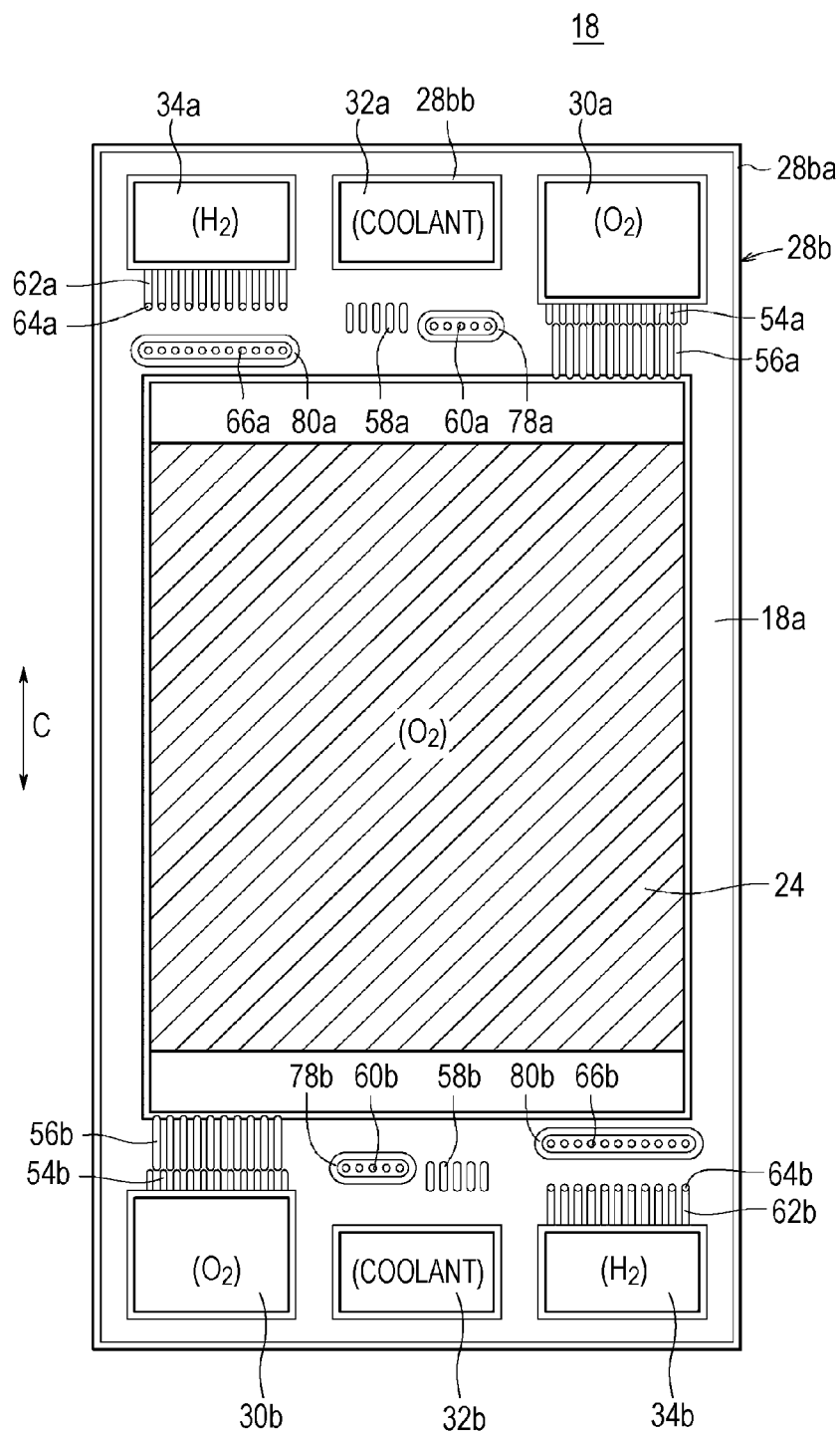
FIG. 5 is an illustration of the cathode face of a second membrane-electrode assembly which constitutes the fuel cell.

As shown in FIG. 5, in the upper portion of the cathode face 18a side (the surface on which the cathode-side electrode 24 is disposed) of the second membrane-electrode assembly 18 in the frame portion 28b, a plurality of inlet projections 54a and a plurality of inlet grooves 56a are provided below and near the oxidant gas inlet communication hole 30a.

In the upper portion of the cathode face 18a side of the frame portion 28b, a plurality of inlet grooves 58a are provided below and near the cooling medium inlet communication hole 32a and in proximity to the fuel gas inlet communication hole 34a, while a plurality of inlet holes 60a are formed below and near the cooling medium inlet communication hole 32a and in proximity to the oxidant gas inlet communication hole 30a. The inlet holes 60a of the second membrane-electrode assembly 18, and the inlet holes 40a of the first membrane-electrode assembly 14 are disposed with an offset so as to not overlap when viewed in the stacking direction.

In the upper portion of the cathode face 18a side of the frame portion 28b, a plurality of inlet grooves 62a are provided below and near the fuel gas inlet communication hole 34a, while a plurality of inlet holes 64a are formed as through holes at the respective lower ends of the inlet grooves 62a. A plurality of inlet holes 66a are formed as through holes spaced apart by a predetermined distance below the respective inlet holes 64a.

In the lower portion of the cathode face 18a side of the frame portion 28b, a plurality of outlet grooves 58b are provided above and near the cooling medium outlet communication hole 32b and in proximity to the fuel gas outlet communication hole 34b, while a plurality of outlet holes 60b are formed above and near the cooling medium outlet communication hole 32b and in proximity to the oxidant gas outlet communication hole 30b. The outlet holes 60b of the second membrane-electrode assembly 18, and the outlet holes 40b of the first membrane-electrode assembly 14 are disposed with an offset so as to not overlap when viewed in the stacking direction.

In the lower portion of the cathode face 18a side of the frame portion 28b, a plurality of outlet grooves 62b are provided above and near the fuel gas outlet communication hole 34b, while a plurality of outlet holes 64b are formed as through holes at the respective upper ends of the outlet grooves 62b. A plurality of outlet holes 66b are formed as through holes spaced apart by a predetermined distance above the respective outlet holes 64b.

Figure 6:
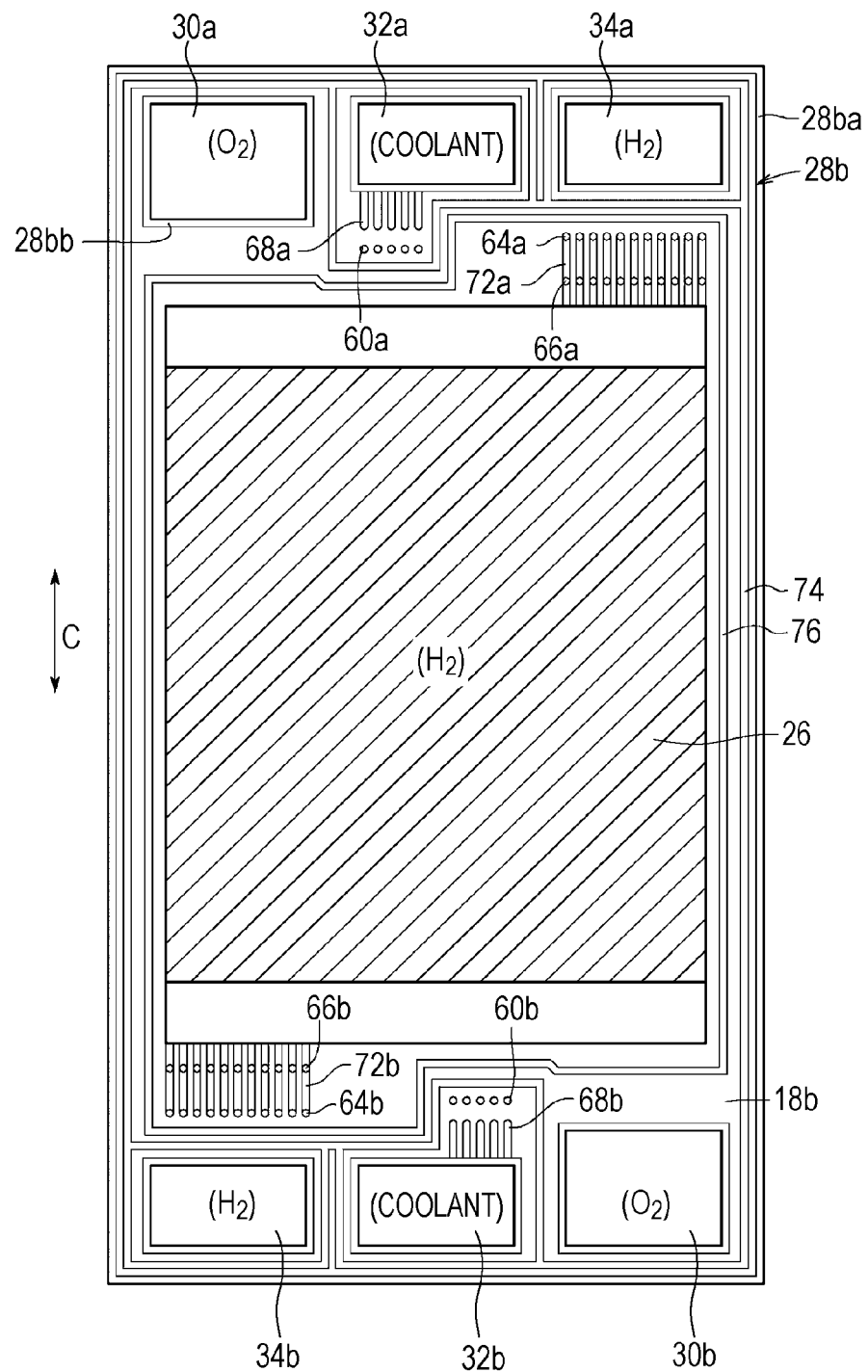
FIG. 6 is an illustration of the anode of the second membrane-electrode assembly.

As shown in FIG. 6, in the upper portion of the anode face 18b side (the surface on which the anode-side electrode 26 is disposed) of the second membrane-electrode assembly 18 in the frame portion 28b, a plurality of inlet grooves 68a are provided below and near the cooling medium inlet communication hole 32a and in proximity to the oxidant gas inlet communication hole 30a. A plurality of inlet holes 60a are formed as through holes below and near the inlet grooves 68a. In the frame portion 28b, a plurality of inlet grooves 72a which communicate between the inlet holes 64a, 66a are provided below the fuel gas inlet communication hole 34a.

In the lower portion of the anode face 18b side of the frame portion 28b, a plurality of outlet grooves 68b are provided above and near the cooling medium outlet communication hole 32b and in proximity to the oxidant gas outlet communication hole 30b. In the upper vicinity of the outlet grooves 68b, a plurality of outlet holes 60b are formed. A plurality of outlet grooves 72b which communicate between the outlet holes 64b, 66b are provided above the fuel gas outlet communication hole 34b.

On the anode face 18b side of the frame portion 28b, an outer seal member (outer seal line) 74, and an inner seal member (inner seal line) 76 are integrally molded or separately molded. The outer seal member 74 surrounds the outer circumferences of all the fluid communication holes, i.e., the oxidant gas inlet communication hole 30a, the cooling medium inlet communication hole 32a, the fuel gas inlet communication hole 34a, the oxidant gas outlet communication hole 30b, the cooling medium outlet communication hole 32b, and the fuel gas outlet communication hole 34b surrounding along the outer peripheral edge of the frame portion 28b as well as the outer circumference of the reaction surface.

The outer seal member 74 surrounds each of the cooling medium inlet communication hole 32a, the fuel gas inlet communication hole 34a, the cooling medium outlet communication hole 32b, and the fuel gas outlet communication hole 34b. The inlet grooves 68a and the inlet holes 60a as well as the cooling medium inlet communication hole 32a are surrounded by the outer seal member 74, and the outlet grooves 68b and the outlet holes 60b as well as the cooling medium outlet communication hole 32b are surrounded by the outer seal member 74.

The inner seal member 76 is located inside the outer seal member 74 and surrounds the anode-side electrode 26, the inlet holes 64a, 66a, the inlet grooves 72a, the outlet holes 64b, 66b, and the outlet grooves 72b.

The inner seal member 76 is disposed along an outer circumference corresponding to the outer edge of the second separator 20, and is in contact with the entire outer peripheral edge of the second separator 20. The outer seal member 74 is disposed outside the outer peripheral edge of the second separator 20. All the fluid communication holes are surrounded and sealed by the outer seal member 74 and the inner seal member 76.

As shown in FIG. 5, on the cathode face 18a side of the frame portion 28b, there are provided ring-shaped inlet seal members 78a, 80a to surround the inlet holes 60a, 66a and ring-shaped outlet seal members 78b, 80b to surround the outlet holes 60b, 66b.

The first and second separators 16, 20 are sized so as to be positioned inside (all the fluid communication holes) the oxidant gas inlet communication hole 30a, the cooling medium inlet communication hole 32a, the fuel gas inlet communication hole 34a, the oxidant gas outlet communication hole 30b, the cooling medium outlet communication hole 32b, and the fuel gas outlet communication hole 34b.

As shown in FIG. 2, the first separator 16 includes two metal plates (for example, stainless plates) 82a, 82b which have the same outer circumferential shape and are stacked one on top of the other, and the outer peripheral edges of the metal plates 82a, 82b are integrally jointed, for example, by welding or bonding, and the inside of the closed metal plates 82a, 82b is hermetically sealed. On the metal plate 82a, an oxidant gas passage 84 is formed so as to face the cathode-side electrode 24, while on the metal plate 82b, a fuel gas passage 86 is formed so as to face the anode-side electrode 26. A cooling medium passage 88 is formed between the metal plates 82a and 82b.

Figure 7:
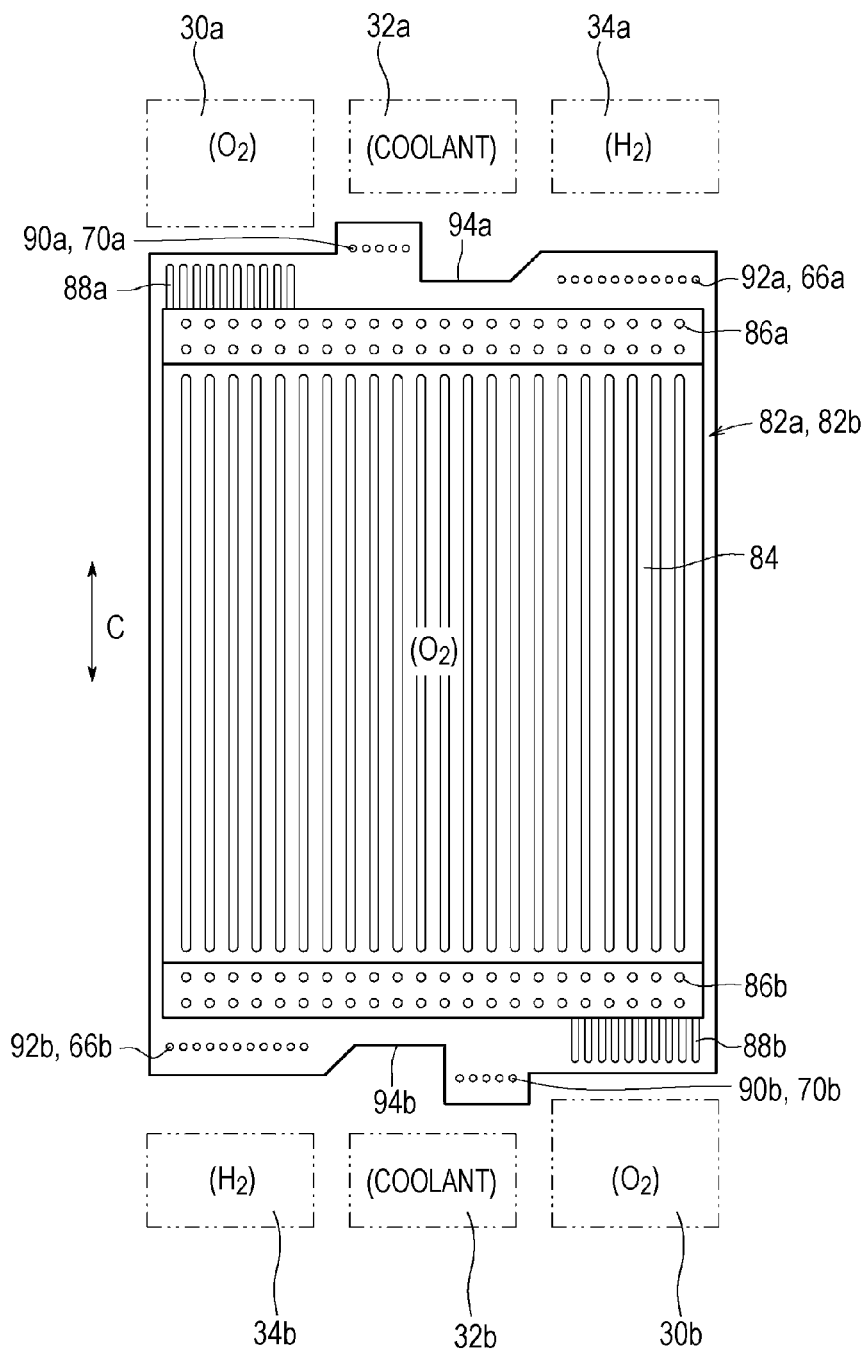
FIG. 7 is an illustration of the cathode face of a first separator which constitutes the fuel cell.

As shown in FIG. 7, the first separator 16 is provided with an oxidant gas passage 84 within the surface of the metal plate 82a, the oxidant gas passage 84 having a plurality of passage grooves which extend in the direction of the arrow C (the vertical direction). An inlet buffer section 86a and an outlet buffer section 86b are provided upstream and downstream of the oxidant gas passage 84, respectively. A plurality of inlet grooves 88a are formed above the inlet buffer section 86a and below the oxidant gas inlet communication hole 30a. A plurality of outlet grooves 88b are formed below the outlet buffer section 86b and above the oxidant gas outlet communication hole 30b.

In the upper portion of the metal plate 82a, a plurality of holes 90a and 92a are formed, the holes 90a communicating with the respective inlet holes 60a of the second membrane-electrode assembly 18, and the holes 92a communicating with the respective inlet holes 66a of the second membrane-electrode assembly 18. The holes 92a are also formed in the metal plate 82b, and thus extend through the first separator 16.

In the lower portion of the metal plate 82a, a plurality of holes 90b and 92b are formed, the holes 90b communicating with the respective outlet holes 60b of the second membrane-electrode assembly 18, and the holes 92b communicating with the respective outlet holes 66b of the second membrane-electrode assembly 18. The holes 92b are also formed in the metal plate 82b, and thus extend through the first separator 16.

The first separator 16 is provided with an upper notch 94a in order to avoid contact with the inlet hole 40a of the first membrane-electrode assembly 14, and a lower notch 94b in order to avoid contact with the outlet hole unit 40b of the first membrane-electrode assembly 14.

Figure 8:
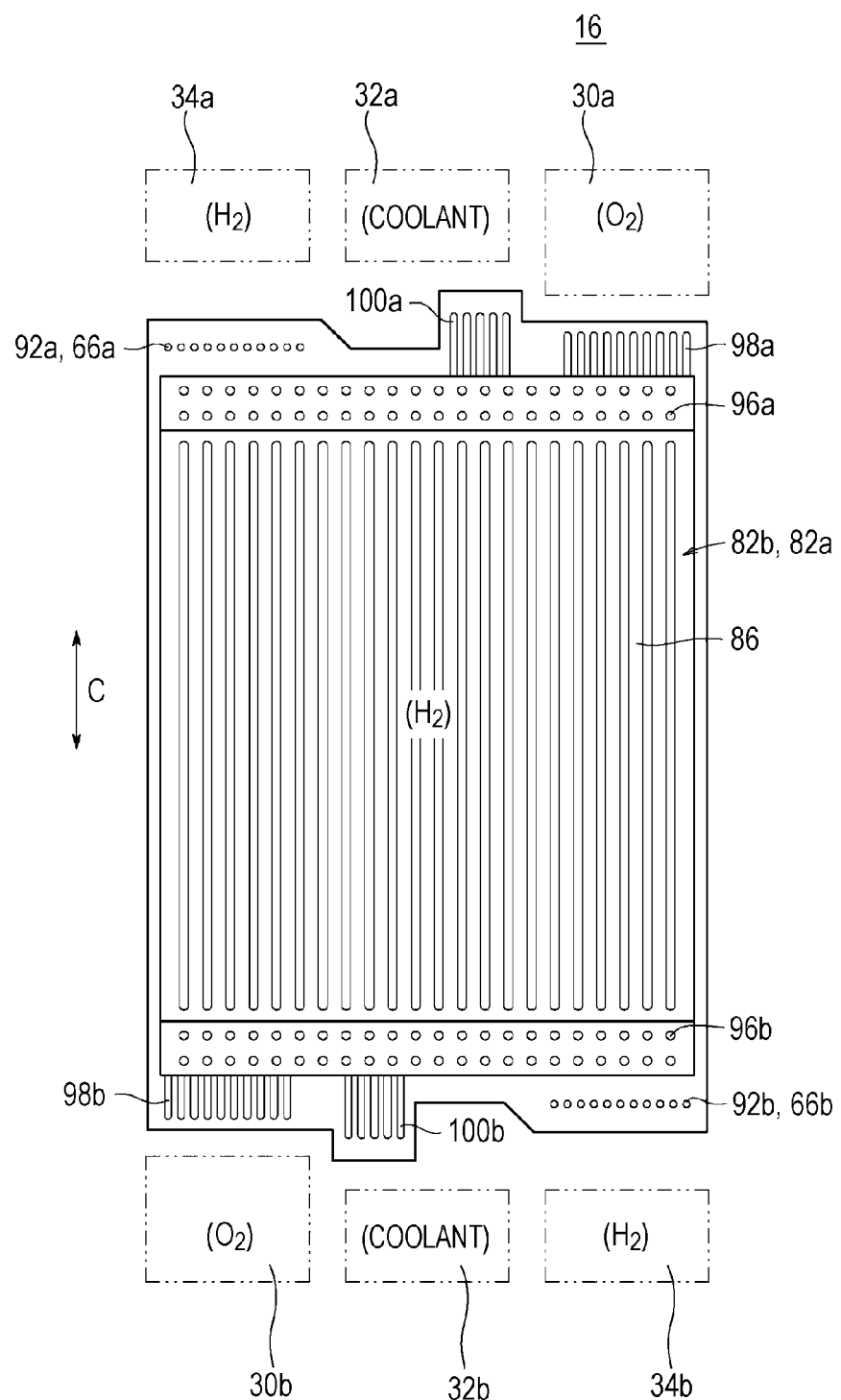
FIG. 8 is an illustration of the anode face of the first separator.

As shown in FIG. 8, the first separator 16 is provided with a fuel gas passage 86 within the surface of the metal plate 82b, the fuel gas passage 86 having a plurality of passage grooves which extend in the direction of the arrow C (the vertical direction). An inlet buffer section 96a and an outlet buffer section 96b are provided upstream and downstream of the fuel gas passage 86, respectively. A plurality of inlet grooves 98a and 100a are formed above the inlet buffer section 96a, and below the oxidant gas inlet communication hole 30a and the cooling medium inlet communication hole 32a, respectively. The inlet grooves 100a have a projection and recess structure to form cooling medium passages inside the first separator 16.

A plurality of outlet grooves 98b and 100b are formed below the outlet buffer section 96b, and above the oxidant gas outlet communication hole 30b and the cooling medium outlet communication hole 32b, respectively. The outlet grooves 100b have a projection and recess structure to form cooling medium passages inside the first separator 16.

As shown in FIG. 2, the second separator 20 includes two metal plates (for example, stainless plate) 102a, 102b which have the same outer circumferential shape and are stacked together, and the outer peripheral edges of the metal plates 102a, 102b are integrally jointed, for example, by welding or bonding, and the inside of the closed metal plates 102a, 102b is hermetically sealed. On the metal plate 102a, an oxidant gas passage 84 is formed so as to face the cathode-side electrode 24, while on the metal plate 102b, a fuel gas passage 86 is formed so as to face the anode-side electrode 26. A cooling medium passage 88 is formed between the metal plates 102a and 102b.

Figure 9:
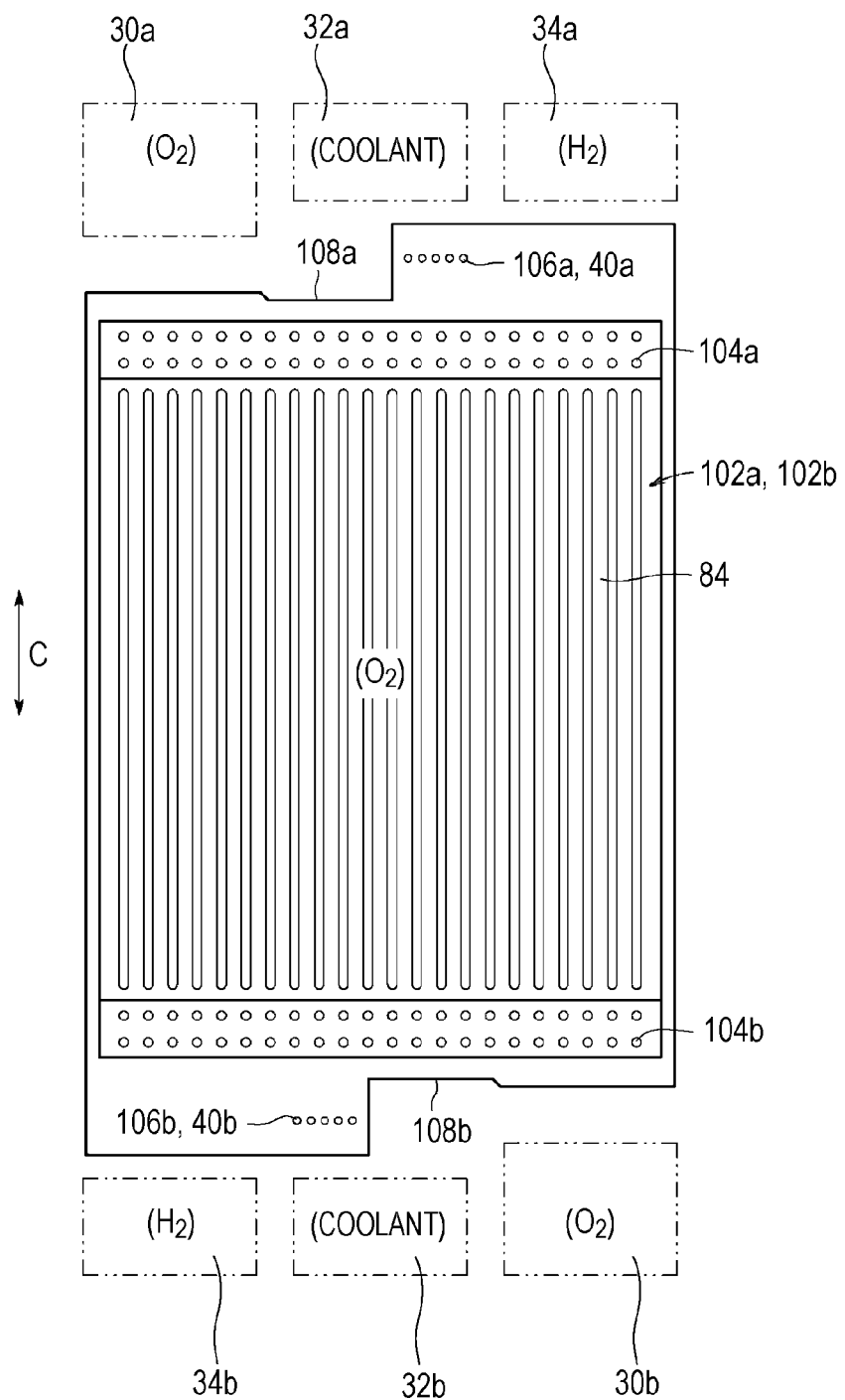
FIG. 9 is an illustration of the cathode face of a second separator which constitutes the fuel cell.

As shown in FIG. 9, the second separator 20 is provided with an oxidant gas passage 84 within the surface of the metal plate 102a, the oxidant gas passage 84 having a plurality of passage grooves which extend in the direction of the arrow C (the vertical direction). An inlet buffer section 104a and an outlet buffer section 104b are provided upstream and downstream of the oxidant gas passage 84, respectively. In the upper portion of the metal plate 102a, a plurality of holes 106a are formed that communicate with the respective inlet holes 40a of the first membrane-electrode assembly 14. In the lower portion of the metal plate 102a, a plurality of holes 106b are formed that communicate with the respective outlet holes 40b of the first membrane-electrode assembly 14.

The second separator 20 is provided with an upper notch 108a to avoid contact with the inlet holes 60a of the second membrane-electrode assembly 18, and a lower notch 108b to avoid contact with the outlet hole unit 60b of the second membrane-electrode assembly 18.

Figure 10:
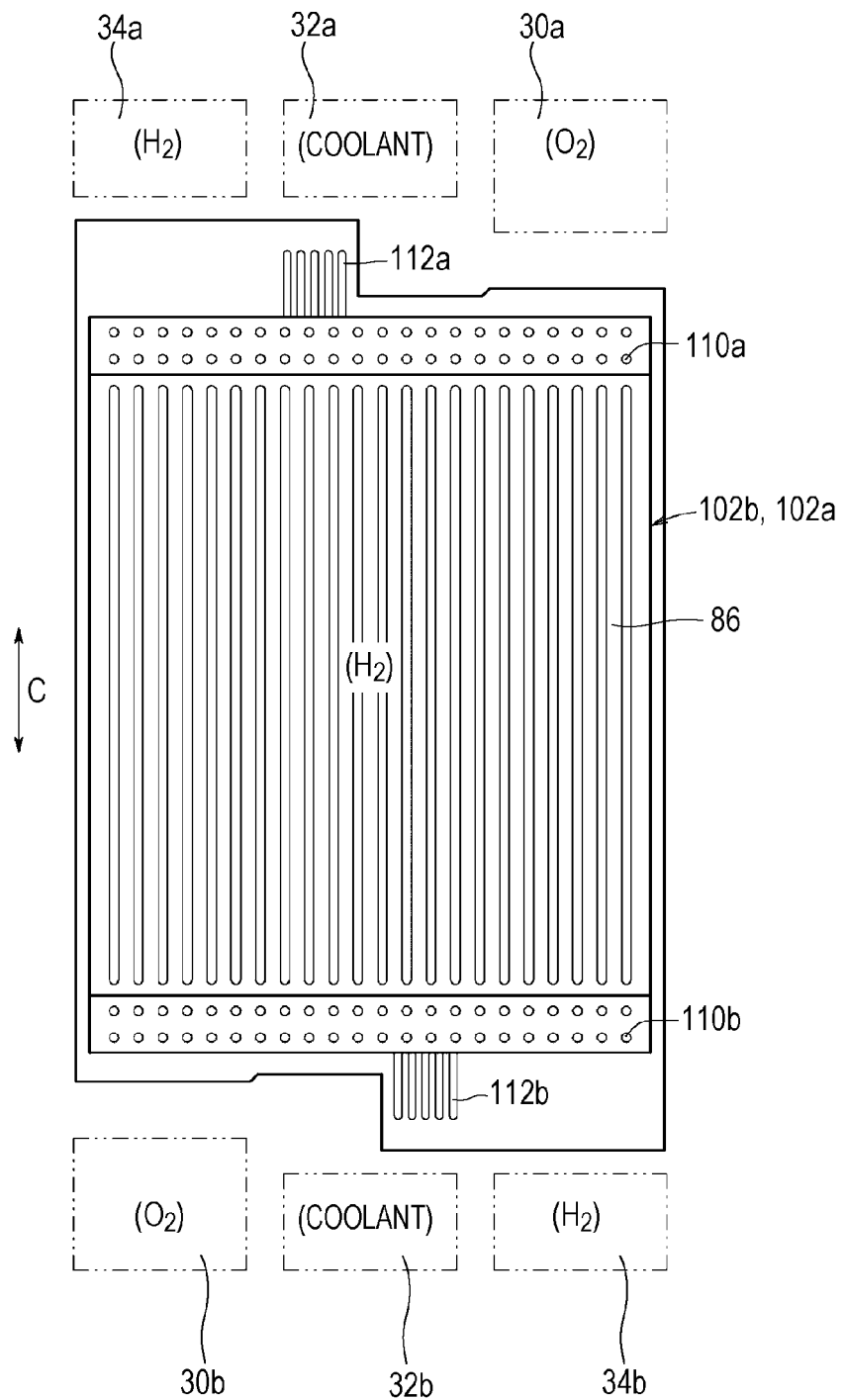
FIG. 10 is an illustration of the anode face of the second separator.

As shown in FIG. 10, the second separator 20 is provided with a fuel gas passage 86 within the surface of the metal plate 102b, the fuel gas passage 86 having a plurality of passage grooves which extend in the direction of the arrow C (the vertical direction). An inlet buffer section 110a and an outlet buffer section 110b are provided upstream and downstream of the fuel gas passage 86, respectively.

In the upper portion of the metal plate 102b, a plurality of inlet grooves 112a are provided below the cooling medium inlet communication hole 32a, while in the lower portion of the metal plate 102b, a plurality of outlet grooves 112b are provided above the cooling medium outlet communication hole 32b. The inlet grooves 112a and the outlet grooves 112b each have a projection and recess structure to form cooling medium passages inside the second separator 20.

As shown in FIGS. 2 to 4, in a first embodiment, the frame portion 28a is provided with a thickened portion (rib projecting in the thickness direction) 28aa along the outermost periphery, i.e., surrounding along the outer peripheral edge. As shown in FIG. 2, the thickness h1 of the thickened portion 28aa is set to be the largest dimension among those of other regions of the frame portion 28a (including several regions such as an MEA contact region 28a1, a seal forming region 28a2, an outer peripheral edge adjacent region 28a3, and a communication hole inner periphery adjacent region, and thus not a specific region).

As shown in FIGS. 3, 4, 11 to 14, the frame portion 28a is provided with a thickened portion (rib projecting in the thickness direction) 28ab surrounding along the periphery of the fluid communication holes, i.e., the oxidant gas inlet communication hole 30a, the cooling medium inlet communication hole 32a, the fuel gas inlet communication hole 34a, the oxidant gas outlet communication hole 30b, the cooling medium outlet communication hole 32b, and the fuel gas outlet communication hole 34b. As shown in FIGS. 11 to 14, the thickness h2 of a thickened portion 28ab is set to be the largest dimension among those of other regions excluding the outer peripheral edge of the frame portion 28a.

As shown in FIGS. 2, 5, and 6, in the first embodiment, the frame portion 28b is provided with a thickened portion (rib projecting in the thickness direction) 28ba along the outermost periphery, i.e., surrounding along the outer peripheral edge. As shown in FIG. 2, the thickness h3 of a thickened portion 28ba is set to be the largest dimension among those of other regions excluding the outer peripheral edge the of frame portion 28b.

As shown in FIGS. 5, 6, 11 to 14, the frame portion 28b is provided with a thickened portion (rib projecting in the thickness direction) 28bb surrounding along the periphery of the fluid communication holes, i.e., the oxidant gas inlet communication hole 30a, the cooling medium inlet communication hole 32a, the fuel gas inlet communication hole 34a, the oxidant gas outlet communication hole 30b, the cooling medium outlet communication hole 32b, and the fuel gas outlet communication hole 34b. As shown in FIGS. 11 to 14, the thickness h4 of the thickened portion 28bb is set to be the largest dimension among those of other regions excluding the outer peripheral edge of the frame portion 28b.

The first and second membrane-electrode assemblies 14, 18 may be provided with either one of the thickened portions 28aa, 28ab, and either one of the thickened portions 28ba, 28bb, respectively, provided that a desired stiffness can be secured by a single thickened portion.

The operation of the fuel cell 10 configured in this manner is described below.

As shown in FIG. 1, an oxidant gas such as an oxygen containing gas is supplied to the oxidant gas inlet communication hole 30a, while a fuel gas such as a hydrogen containing gas is supplied to the fuel gas inlet communication hole 34a. In addition, a cooling medium such as pure water or ethylene glycol is supplied to the cooling medium inlet communication hole 32a.

Figure 11:
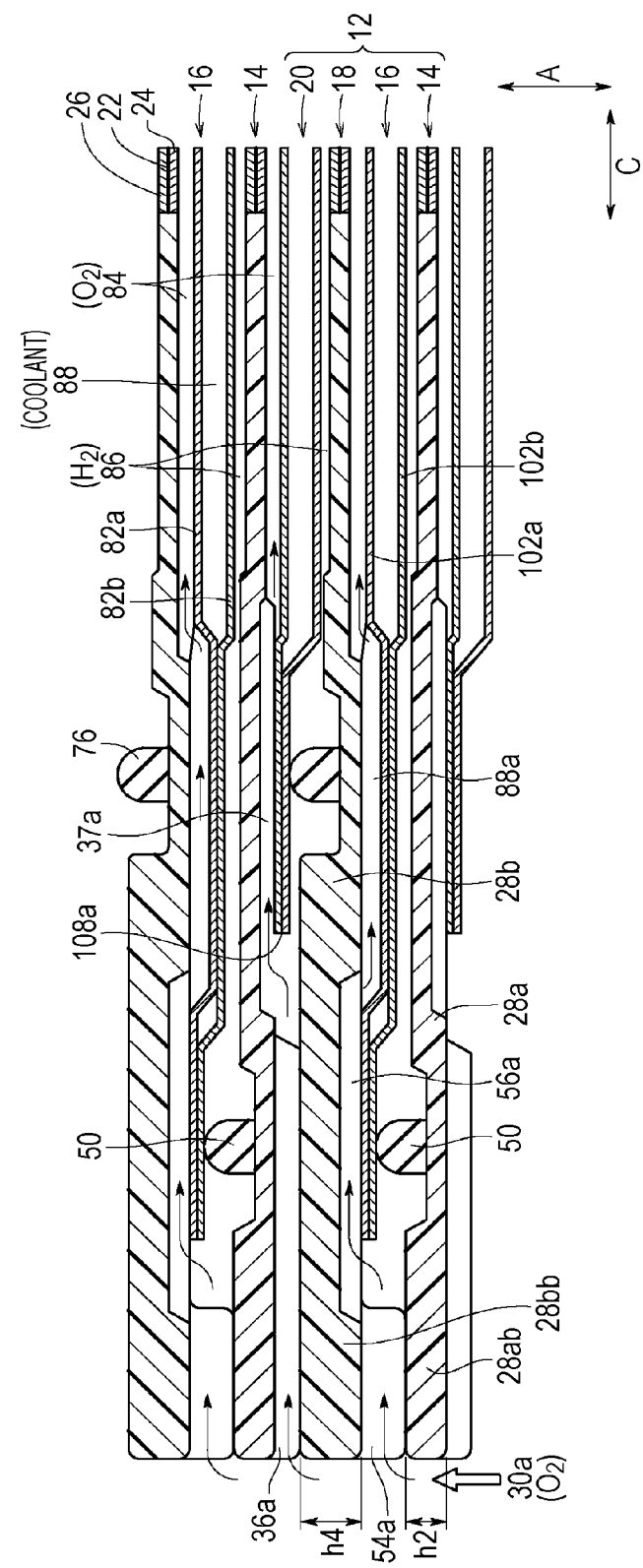
FIG. 11 is a cross-sectional view of the fuel cell taken along the line XI-XI in FIG. 1.

In each cell unit 12, the oxidant gas supplied to the oxidant gas inlet communication hole 30a is introduced into the inlet projections 36a of the first membrane-electrode assembly 14 and into the inlet grooves 56a through the inlet projections 54a of the second membrane-electrode assembly 18 as shown in FIGS. 1 and 11.

The oxidant gas introduced into the inlet projections 36a is supplied to the oxidant gas passage 84 of the second separator 20 through the respective inlet grooves 37a. The oxidant gas supplied to the oxidant gas passage 84 is supplied to the cathode-side electrode 24 of the first membrane-electrode assembly 14, and then exhausted oxidant gas is discharged into the oxidant gas outlet communication hole 30b through the outlet projections 36b.

On the other hand, the oxidant gas introduced into the inlet grooves 56a is supplied to the oxidant gas passage 84 of the first separator 16 through the inlet grooves 88a between the second membrane-electrode assembly 18 and the first separator 16. The oxidant gas supplied to the oxidant gas passage 84 is supplied to the cathode-side electrode 24 of the second membrane-electrode assembly 18, and then exhausted oxidant gas is discharged into the oxidant gas outlet communication hole 30b through the outlet grooves 88b, 56b and the outlet projections 54b.

Figure 12:
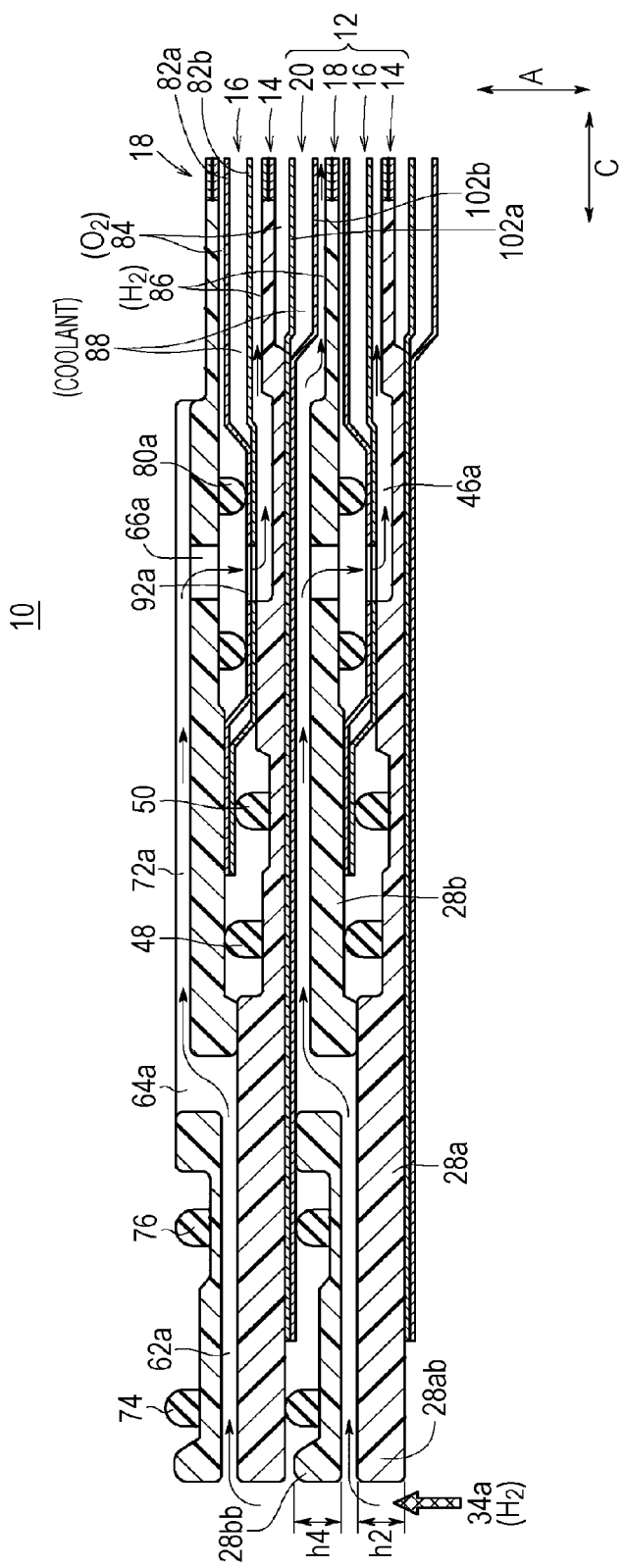
FIG. 12 is a cross-sectional view of the fuel cell taken along the line XII-XII in FIG. 1.

The fuel gas supplied to the fuel gas inlet communication hole 34a is introduced into the inlet grooves 62a on the cathode side of the second membrane-electrode assembly 18 as shown in FIGS. 1 and 12. The fuel gas moves to the anode side through the inlet grooves 62a and the inlet hole 64a, and part of the fuel gas is supplied to the fuel gas passage 86 of the second separator 20 through the inlet grooves 72a.

The rest of the fuel gas is introduced into between the first separator 16 and the first membrane-electrode assembly 14, through the inlet holes 66a and the holes 92a of the first separator 16, and is supplied to the fuel gas passage 86 of the first separator 16.

The exhausted fuel gas which has flown through the fuel gas passage 86 of the second separator 20 is discharged into the outlet grooves 72b, and is further discharged into the fuel gas outlet communication hole 34b through the outlet holes 64b and the outlet grooves 62b. On the other hand, the exhausted fuel gas which has flown through the fuel gas passage 86 of the first separator 16 is discharged into the outlet grooves 72b through the holes 92b and the outlet holes 66b, and is discharged into the fuel gas outlet communication hole 34b in a similar manner.

Consequently, the oxidant gas supplied to the cathode-side electrode 24 and the fuel gas supplied to the anode-side electrode 26 are consumed by an electrochemical reaction in respective electrode catalyst layers in the first membrane-electrode assembly 14, and the second membrane-electrode assembly 18, and thus electric power is generated.

Figure 13:
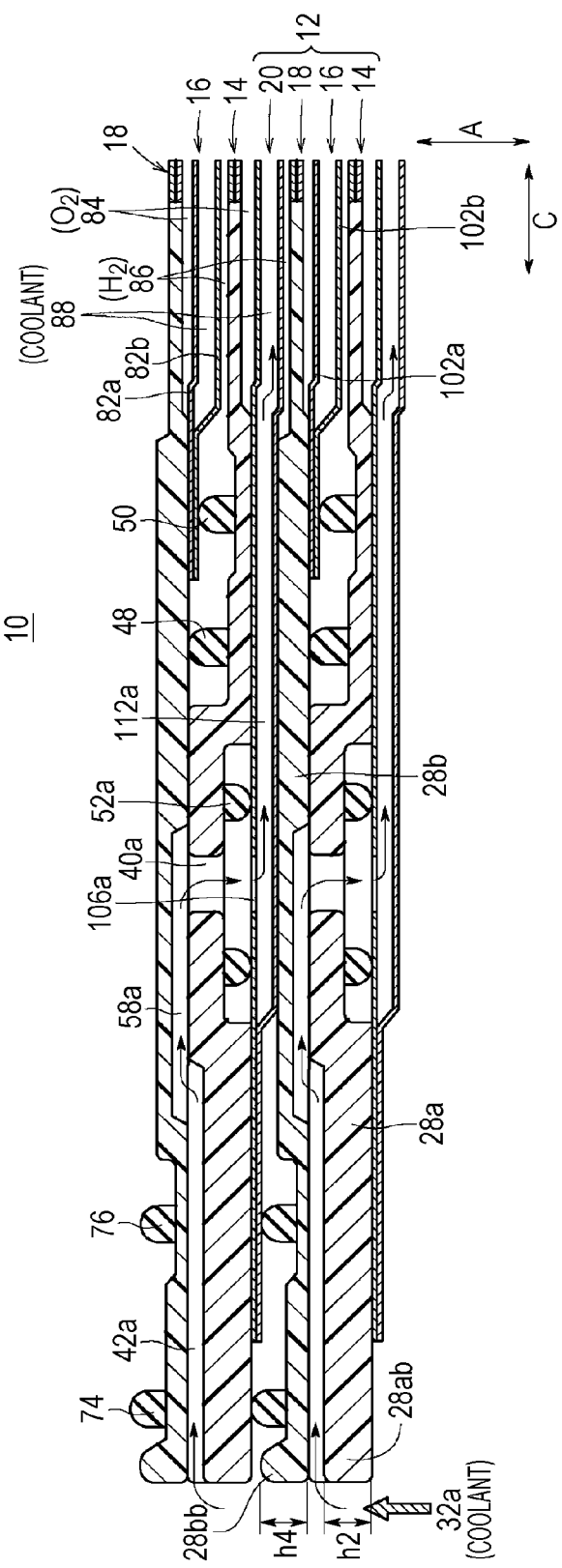
FIG. 13 is a cross-sectional view of the fuel cell taken along the line XIII-XIII in FIG. 1.

As shown in FIGS. 1 and 13, part of the cooling medium supplied to the cooling medium inlet communication hole 32a is introduced into the inlet grooves 42a of the first membrane-electrode assembly 14, and then is supplied to the inlet grooves 58a and to the inlet holes 40a. The cooling medium is introduced from the inlet holes 40a to the inside of the second separator 20 through the holes 106a of the second separator 20.

The cooling medium flows through inside the second separator 20 along the inlet grooves 112a, and is supplied to the cooling medium passage 88, then is discharged from the second separator 20 through the outlet grooves 112b and the holes 106b. In addition, the cooling medium is discharged into the cooling medium outlet communication hole 32b through the outlet holes 40b and the outlet grooves 58b, 42b.

Figure 14:
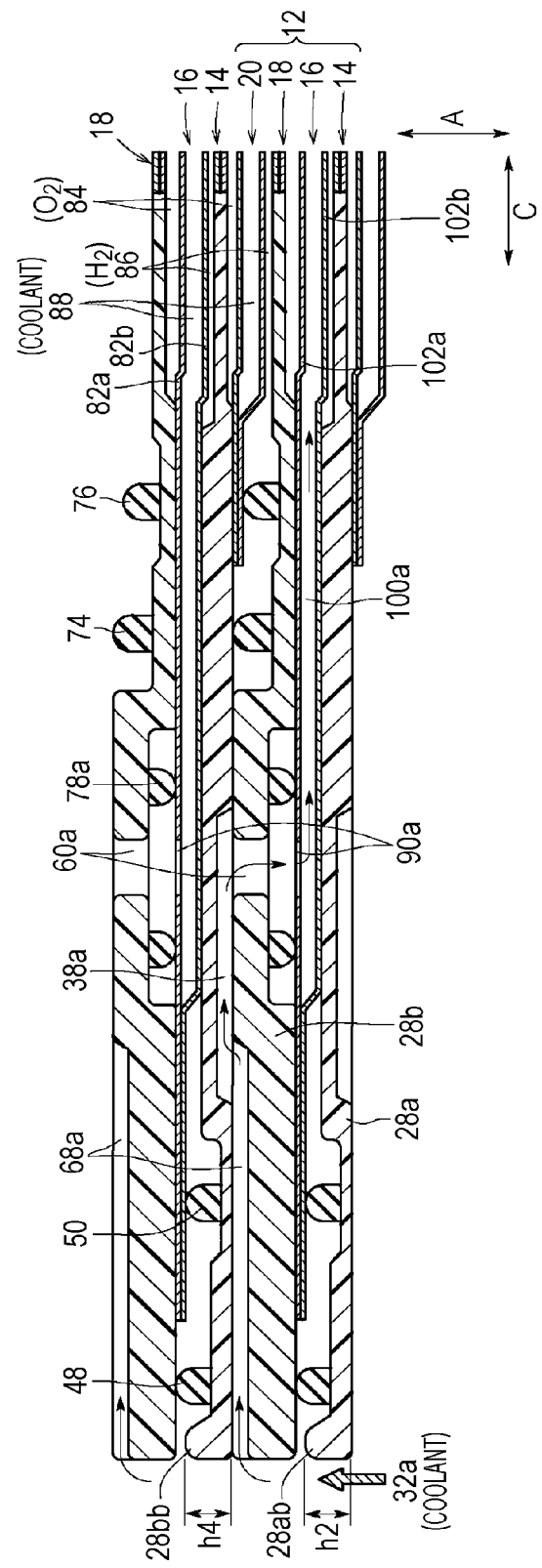
FIG. 14 is a cross-sectional view of the fuel cell taken along the line XIV-XIV in FIG. 1.

On the other hand, as shown in FIGS. 1 and 14, some other cooling medium supplied to the cooling medium inlet communication hole 32a is introduced into the inlet grooves 68a of the second membrane-electrode assembly 18, and is supplied from inlet groove 38a to the inlet holes 60a. The cooling medium is introduced from the inlet holes 60a to the inside of the first separator 16 through the holes 90a of the first separator 16.

The cooling medium flows through inside the first separator 16 along the inlet grooves 100a, and is supplied to the cooling medium passage 88, then is discharged from the first separator 16 through the outlet grooves 100b and the holes 90b. In addition, the cooling medium is discharged into the cooling medium outlet communication hole 32b through the outlet holes 60b and the outlet grooves 38b, 68b.

Accordingly, first membrane-electrode assembly 14, and the second membrane-electrode assembly 18 are cooled by the cooling medium that passes through the cooling medium passage 88 in the first separator 16 and the cooling medium passage 88 in the second separator 20.

In the first embodiment in this case, the frame portion 28a which constitutes the first membrane-electrode assembly 14, and the frame portion 28b which constitutes the second membrane-electrode assembly 18 include the oxidant gas inlet communication hole 30a, the cooling medium inlet communication hole 32a, the fuel gas inlet communication hole 34a, the oxidant gas outlet communication hole 30b, the cooling medium outlet communication hole 32b, and the fuel gas outlet communication hole 34b that are formed as through holes in the stacking direction.

Therefore, it is not necessary to provide a fluid communication hole in the first separator 16 and the second separator 20, and thus the first separator 16 and the second separator 20 may be set to have an outer dimension corresponding to the power generation region. Consequently, the first separator 16 and the second separator 20 may be easily miniaturized and light-weighted, and thus the manufacturing cost of the first separator 16 and the second separator 20 may be reduced.

Accordingly, the first separator 16 and the second separator 20 may be manufactured efficiently, and thus provides an advantage that the entire fuel cell 10 may be economically produced.

Furthermore, as shown in FIG. 2, the frame portion 28a which constitutes the first membrane-electrode assembly 14 is provided with the thickened portion 28aa with the thickness h1, which is the largest dimension among those of other regions along the outer peripheral edge excluding the outer peripheral edge. Similarly, the frame portion 28b which constitutes the second membrane-electrode assembly 18 is provided with the thickened portion 28ba with the thickness h3, which is the largest dimension among those of other regions along the outer peripheral edge excluding the outer peripheral edge.

Thus, the first and second membrane-electrode assemblies 14, 18, and the frame portions 28a, 28b may be reduced in thickness, and the overall stiffness of the first and second membrane-electrode assemblies 14, 18 can be secured. Consequently, the following effects may be obtained: relatively expensive first separator 16 and second separator 20 may be favorably miniaturized and the manufacturing cost may be reduced, and the stiffness of the first and second membrane-electrode assemblies 14, 18 may be effectively increased.

On the other hand, as shown in FIGS. 11 to 14, the frame portions 28a, 28b are provided with thickened portions 28ab, 28bb around the fluid communication holes, respectively. The thickened portions 28ab, 28bb have respective thicknesses h2, h4 which are the largest dimensions among those of other regions along the respective outer peripheral edges excluding the outer peripheral edges. Thus, the following effects can be obtained: the first and second membrane-electrode assemblies 14, 18 may be reduced in thickness and the overall stiffness of the first and second membrane-electrode assemblies 14, 18 may be effectively increased.

Figure 15:
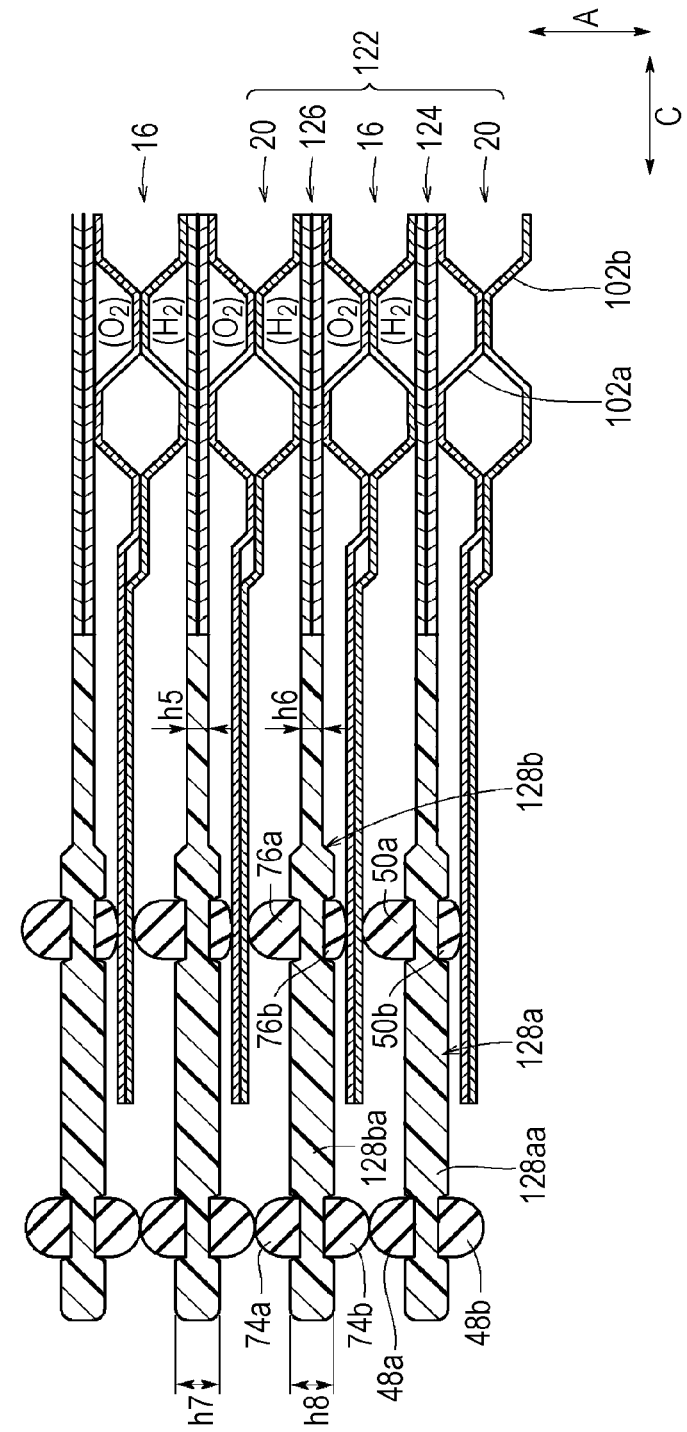
FIG. 15 is a cross-sectional view of a fuel cell according to a second embodiment of the present invention.
Figure 16:
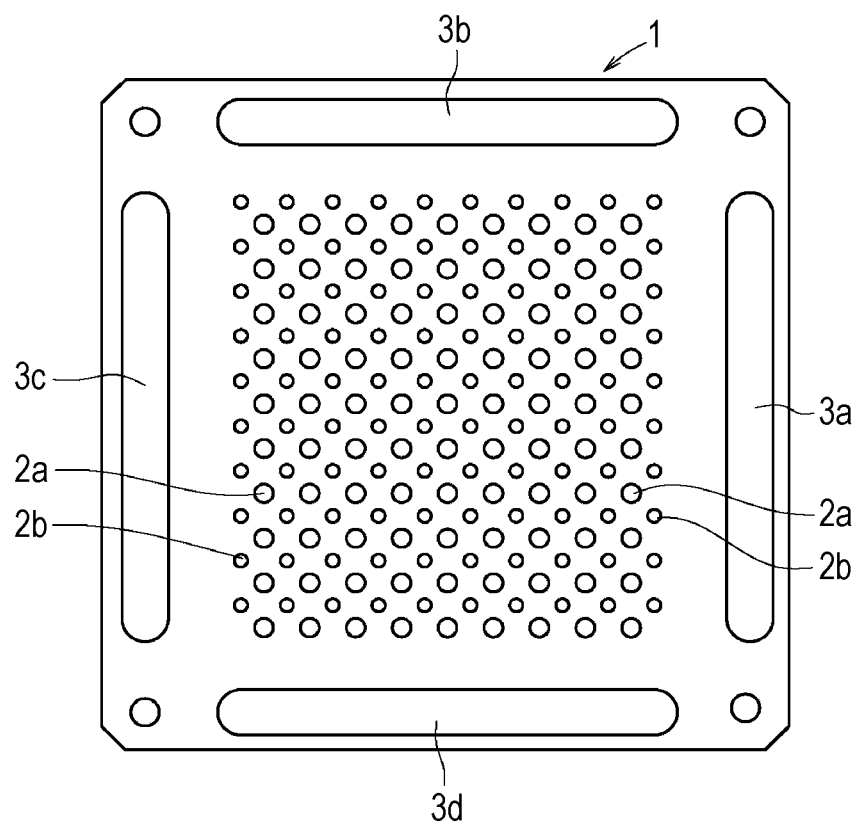
FIG. 16 is an illustration of a separator for fuel cells disclosed in Japanese Unexamined Patent Application Publication No. 8-222237.

FIG. 15 is a cross-sectional view of a main part of a fuel cell 120 according to a second embodiment of the present invention. The same components as those of the fuel cell 10 according to the first embodiment are labeled with the same reference symbols, and detailed description is omitted.

The fuel cell 120 is formed by stacking a plurality of cell units 122, each cell unit 122 including a first membrane-electrode assembly (electrolyte-electrode assembly) (MEA) 124, a first separator 16, a second membrane-electrode assembly (electrolyte-electrode assembly) (MEA) 126, and a second separator 20.

The first membrane-electrode assembly 124, and the second membrane-electrode assembly 126 are provided with a frame portion (frame member) 128a and a frame portion (frame member) 128b, respectively, which are composed of a polymer material having an insulation property.

In the frame portions 128a, 128b, connection regions (other regions) having thicknesses h5, h6 that are the same as the overall thickness in the stacking direction are respectively connected to the outer peripheral edges of the solid polymer electrolyte membrane 22, the cathode-side electrode 24, and the anode-side electrode 26, while in the outer side of the connection regions, there are provided thickened portions (ribs projecting in the thickness direction) 128aa, 128ba with respective thicknesses h7, h8 which are set to be larger than the thicknesses h5, h6 of the connection regions(h7>h5, h8>h6), respectively.

The thickened portions 128aa, 128ba surround the outer peripheral edges of the frame portions 128a, 128b as well as the fluid communication holes (the oxidant gas inlet communication hole 30a, the cooling medium inlet communication hole 32a, the fuel gas inlet communication hole 34a, the oxidant gas outlet communication hole 30b, the cooling medium outlet communication hole 32b, and the fuel gas outlet communication hole 34b).

On the respective sides of the frame portion 128a, outer seal members (outer seal lines) 48a, 48b, and inner seal members (inner seal lines) 50a, 50b are integrally molded or separately molded. On the respective sides of the frame portion 128b, outer seal members (outer seal lines) 74a, 74b, and inner seal members (inner seal lines) 76a, 76b are integrally molded or separately molded.

In this manner, in the second embodiment configured, similar effects to those of the first embodiment are obtained, i.e., manufacturing cost may be reduced, and the overall stiffness of the first and second membrane-electrode assemblies 124, 126 may be effectively increased.

The embodiment of the present invention relates to a fuel cell including a cell unit, in which an electrolyte-electrode assembly is sandwiched between a first separator and a second separator, the electrolyte-electrode assembly including an electrolyte and a pair of electrodes that are disposed on the respective sides of the electrolyte.

In the fuel cell, a frame member composed of a polymer material is integrally formed on the outer periphery of the electrolyte-electrode assembly, and fluid communication holes are formed as through holes in the frame member in the stacking direction, the fluid communication holes having a reactant gas inlet communication hole, a reactant gas outlet communication hole, a cooling medium inlet communication hole, and a cooling medium outlet communication hole, while a seal member is sandwiched between the frame members that are adjacent to each other in the stacking direction, the seal member surrounding and sealing the fluid communication holes and the outer periphery of a reaction surface. Thus, the first and second separators do not need to be provided with respective fluid communication holes. Therefore, the first and second separators may be set to have outer dimensions corresponding to the respective power generation regions, and may be designed to be compact and lightweight, and thus the manufacturing cost of the first and second separators may be reduced. Accordingly, the first and second separators may be manufactured efficiently, and thus provides an advantage that the entire fuel cell may be economically produced.

The first and second separators each have two plates with an identical outer shape, and the outer peripheral edges of the first and second separators are arranged inside the fluid communication holes, and the frame member has a rib projecting in a thickness direction, at least around the outermost periphery or the fluid communication holes. Thus, the electrolyte-electrode assembly and the frame portion may be reduced in thickness, and the overall stiffness of the electrolyte-electrode assembly may be secured. Consequently, relatively expensive separator may be favorably miniaturized, and the manufacturing cost may be reduced, and thus the stiffness of the electrolyte-electrode assembly used may be effectively increased.

In addition, the electrolyte-electrode assembly includes a first electrolyte-electrode assembly and a second electrolyte-electrode assembly, and the cell unit may include the first electrolyte-electrode assembly, the first separator, the second electrolyte-electrode assembly, and the second separator, and the first and second separators are each formed by bonding the two plates, and a cooling medium passage is formed between the two plates, the cooling medium passage allowing a cooling medium to flow in the planar direction of the separator surface.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell comprising:
a cell unit comprising:
a first separator;
a second separator; and
an electrolyte-electrode assembly having an electrolyte and a pair of electrodes, the pair of electrodes being disposed on respective sides of the electrolyte, the electrolyte-electrode assembly being sandwiched between the first separator and the second separator in a stacking direction, wherein
frame members are integrally provided on an outer periphery of the electrolyte-electrode assembly, the frame members being composed of plastic,
fluid communication holes are provided as through holes in the stacking direction in each of the frame members, the fluid communication holes having a reactant gas inlet communication hole, a reactant gas outlet communication hole, a cooling medium inlet communication hole, and a cooling medium outlet communication hole,
a seal member is sandwiched between the frame members that are adjacent to each other in the stacking direction, the seal member surrounding and sealing the fluid communication holes and an outer periphery of a reaction surface of the electrolyte-electrode assembly,
the first and second separators each has two plates with an identical outer shape, outer peripheral edges of the first and second separators being arranged inside the fluid communication holes, and
each of the frame members has a rib continuously formed as part of the plastic of the frame member and projecting in a thickness direction of the frame member, the thickness direction being parallel to the stacking direction, at least around one of an entire outer periphery of the frame member and an entire outer periphery of the fluid communication holes.

2. The fuel cell according to claim 1, wherein
the electrolyte-electrode assembly includes a first electrolyte-electrode assembly and a second electrolyte-electrode assembly,
the cell unit comprises the first electrolyte-electrode assembly, the first separator, the second electrolyte-electrode assembly, and the second separator,
the first and second separators are each provided by bonding the two plates,
a first cooling medium passage is provided between the two plates provided in the first separator, the first cooling medium passage allowing a cooling medium to flow in a planar direction parallel to a separator surface of the first separator, and
a second cooling medium passage is provided between the two plates provided in the second separator, the second cooling medium passage allowing a cooling medium to flow in a planar direction parallel to a separator surface of the second separator.

3. The fuel cell according to claim 1, wherein
the first and second electrolyte-electrode assemblies respectively include the frame members.

4. The fuel cell according to claim 1, wherein
the electrolyte-electrode assembly includes a first electrolyte-electrode assembly and a second electrolyte-electrode assembly,
the second electrolyte-electrode assembly is disposed between the first and second separators in the stacking direction, and
the first separator is disposed between the first and second electrolyte-electrode assemblies in the stacking direction.

5. The fuel cell according to claim 1, wherein
the first and second electrolyte-electrode assemblies respectively include the frame members.

6. The fuel cell according to claim 1, wherein
the first and second separators disposed between the reactant gas inlet communication hole and the reactant gas outlet communication hole when viewed from the stacking direction.

7. The fuel cell according to claim 6, wherein
the first and second separators disposed between the cooling medium inlet communication hole and the cooling medium outlet communication hole when viewed from the stacking direction.

8. The fuel cell according to claim 1, wherein
the first and second separators disposed between the cooling medium inlet communication hole and the cooling medium outlet communication hole when viewed from the stacking direction.

9. The fuel cell according to claim 1, wherein
the rib projects from a first surface of the frame member and from a second surface of the frame member, the second surface being opposite to the first surface.

10. The fuel cell according to claim 1, wherein
the two plates of the first and second separators have the identical outer shape about an entire outer periphery of the two plates.

11. A fuel cell comprising:
a cell unit comprising:
a first separator;
a second separator; and
an electrolyte-electrode assembly having an electrolyte and a pair of electrodes, the pair of electrodes being disposed on respective sides of the electrolyte, the electrolyte-electrode assembly being sandwiched between the first separator and the second separator in a stacking direction, wherein
frame members are integrally provided on an outer periphery of the electrolyte-electrode assembly, the frame members being composed of plastic,
fluid communication holes are provided as through holes in the stacking direction in each of the frame members, the fluid communication holes having a reactant gas inlet communication hole, a reactant gas outlet communication hole, a cooling medium inlet communication hole, and a cooling medium outlet communication hole,
a seal member is sandwiched between the frame members that are adjacent to each other in the stacking direction, the seal member surrounding and sealing the fluid communication holes and an outer periphery of a reaction surface of the electrolyte-electrode assembly,
the first and second separators each has two plates with an identical outer shape about an entire outer periphery of the two plates, outer peripheral edges of the first and second separators being arranged inside the fluid communication holes, and
each of the frame members has a rib continuously formed as part of the plastic of the frame member and projecting in a thickness direction of the frame member, the thickness direction being parallel to the stacking direction, at least around one of an outermost periphery of the frame member and the fluid communication holes.

12. The fuel cell according to claim 11, wherein
the electrolyte-electrode assembly includes a first electrolyte-electrode assembly and a second electrolyte-electrode assembly,
the cell unit comprises the first electrolyte-electrode assembly, the first separator, the second electrolyte-electrode assembly, and the second separator,
the first and second separators are each provided by bonding the two plates,
a first cooling medium passage is provided between the two plates provided in the first separator, the first cooling medium passage allowing a cooling medium to flow in a planar direction parallel to a separator surface of the first separator, and
a second cooling medium passage is provided between the two plates provided in the second separator, the second cooling medium passage allowing a cooling medium to flow in a planar direction parallel to a separator surface of the second separator.

13. The fuel cell according to claim 11, wherein
the first and second electrolyte-electrode assemblies respectively include the frame members.

14. The fuel cell according to claim 11, wherein
the electrolyte-electrode assembly includes a first electrolyte-electrode assembly and a second electrolyte-electrode assembly,
the second electrolyte-electrode assembly is disposed between the first and second separators in the stacking direction, and
the first separator is disposed between the first and second electrolyte-electrode assemblies in the stacking direction.

15. The fuel cell according to claim 11, wherein
the first and second electrolyte-electrode assemblies respectively include the frame members.

16. The fuel cell according to claim 11, wherein
the first and second separators disposed between the reactant gas inlet communication hole and the reactant gas outlet communication hole when viewed from the stacking direction.

17. The fuel cell according to claim 16, wherein
the first and second separators disposed between the cooling medium inlet communication hole and the cooling medium outlet communication hole when viewed from the stacking direction.

18. The fuel cell according to claim 11, wherein
the first and second separators disposed between the cooling medium inlet communication hole and the cooling medium outlet communication hole when viewed from the stacking direction.

19. The fuel cell according to claim 11, wherein
the rib projects from a first surface of the frame member and from a second surface of the frame member, the second surface being opposite to the first surface.

* * * * *